United States Patent [19]
Kingstone et al.

[11] Patent Number: 5,838,860
[45] Date of Patent: *Nov. 17, 1998

[54] FIBER OPTIC LIGHT SOURCE APPARATUS AND METHOD

[75] Inventors: Brett M. Kingstone, Orlando; Pinhas Koren, Altamonte Springs, both of Fla.

[73] Assignee: Super Vision International, Inc., Orlando, Fla.

[*] Notice: The term of this patent shall not extend beyond the expiration date of Pat. Nos. 5,520,714 and 5,617,494.

[21] Appl. No.: 664,438

[22] Filed: Jun. 18, 1996

Related U.S. Application Data

[63] Continuation-in-part of Ser. No. 311,129, Sep. 23, 1994, Pat. No. 5,528,714, and Ser. No. 277,887, Jul. 20, 1994, Pat. No. 5,617,496, which is a continuation of Ser. No. 65,942, May 21, 1993, Pat. No. 5,333,228.

[51] Int. Cl.⁶ .............................. G02B 6/00; G02B 6/44
[52] U.S. Cl. ............................................. 385/100
[58] Field of Search .................................. 385/100–109, 385/147, 900, 901, 902; 362/32, 293, 319

[56] References Cited

U.S. PATENT DOCUMENTS

| | | | |
|---|---|---|---|
| 4,226,504 | 10/1980 | Bellino | 385/104 |
| 4,375,313 | 3/1983 | Anderson et al. | 385/103 |
| 4,496,214 | 1/1985 | Oestreich et al. | 385/103 |
| 4,519,017 | 5/1985 | Daniel | 362/32 |
| 4,593,973 | 6/1986 | Yoshida et al. | 385/126 |
| 4,645,298 | 2/1987 | Gartside | 385/106 |
| 4,703,998 | 11/1987 | Uchioke et al. | 385/105 |
| 4,704,660 | 11/1987 | Robbins | 362/32 |
| 4,715,700 | 12/1987 | Daniel | 385/31 |
| 4,744,631 | 5/1988 | Eichenbaum | 350/96.2 |
| 4,763,984 | 8/1988 | Awai et al. | 350/96.2 |
| 4,783,953 | 11/1988 | Akre | 385/106 |
| 4,820,014 | 4/1989 | Nishimura et al. | 385/105 |
| 4,825,341 | 4/1989 | Awai | 362/32 |
| 4,875,215 | 10/1989 | Hughes | 385/100 |
| 4,894,760 | 1/1990 | Callahan | 362/293 |
| 4,922,385 | 5/1990 | Awai | 362/32 |
| 4,933,815 | 6/1990 | Parthasarathy | 362/32 |
| 4,965,701 | 10/1990 | Voland | 362/32 |
| 4,997,258 | 3/1991 | Oestreich | 385/105 |
| 5,013,109 | 5/1991 | Zelan et al. | 350/96.1 |
| 5,016,152 | 5/1991 | Awai et al. | 362/293 |
| 5,021,928 | 6/1991 | Daniel | 385/31 X |
| 5,155,789 | 10/1992 | LeNoane et al. | 385/106 |
| 5,183,323 | 2/1993 | Daniel | 362/32 |
| 5,222,177 | 6/1993 | Chu et al. | 385/103 |
| 5,268,971 | 12/1993 | Nilsson et al. | 385/103 |
| 5,268,983 | 12/1993 | Tatarka et al. | 385/103 |
| 5,389,442 | 2/1995 | Arroyo et al. | 385/103 |
| 5,463,712 | 10/1995 | Cawood | 385/117 |
| 5,528,714 | 6/1996 | Kingstone et al. | 385/100 |
| 5,617,497 | 4/1997 | Kingstone | 385/100 |

*Primary Examiner*—Akm E. Ullah
*Attorney, Agent, or Firm*—James H. Beusse; Maguire, Voorhis & Wells

[57] ABSTRACT

A fiber optic cable lateral illumination system comprising a housing having an internal cavity and an aperture communicating the cavity externally of the housing, an optical system located within the internal cavity; the optical system comprising a reflector and a high intensity lamp positioned within the reflector for directing light along an optical axis, a plate of heat absorbing material spaced from the reflector, and at least one color filter spaced from the plate and the reflector; the optical cable including a plurality of optical fibers and a ferrule assembly for supporting the cable to the optical system.

18 Claims, 11 Drawing Sheets

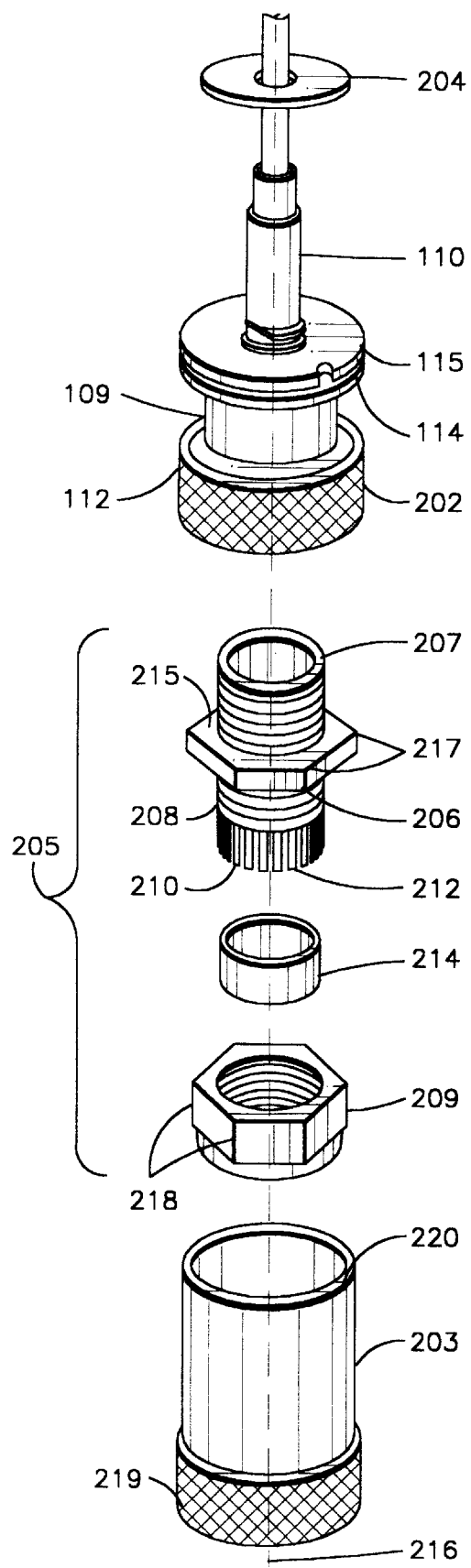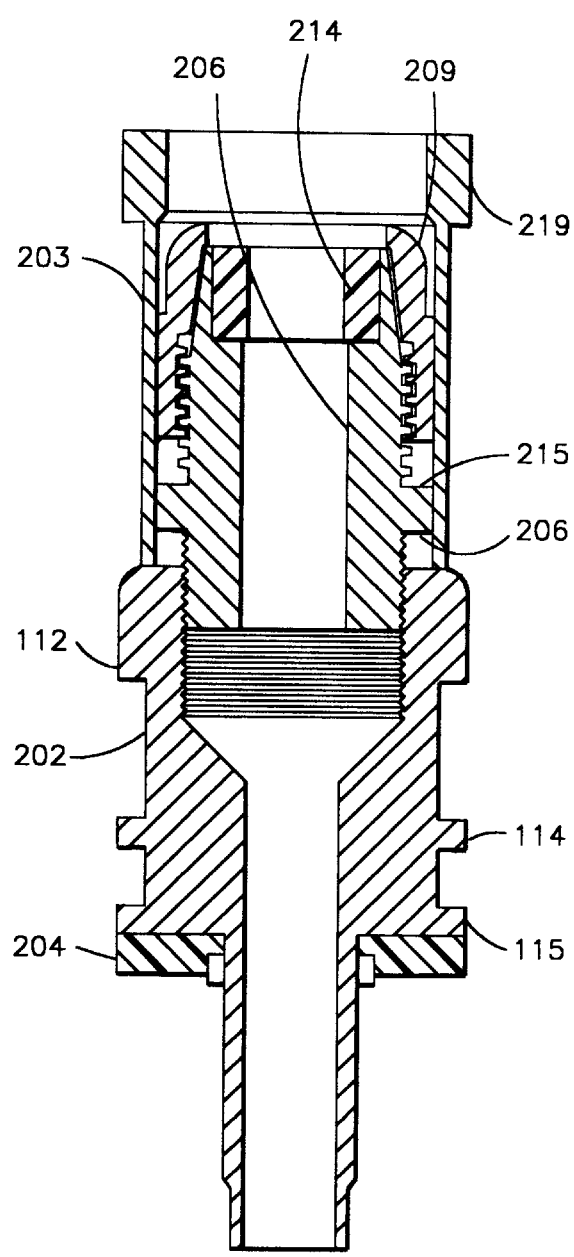
FIG. 13
FIG. 12

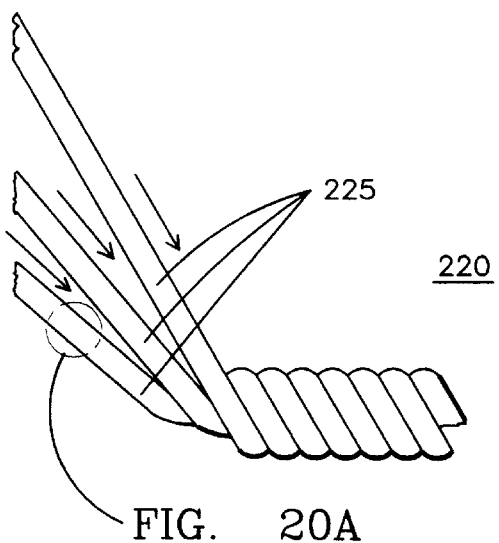
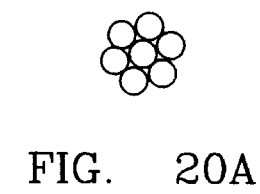
FIG. 20A
FIG. 20
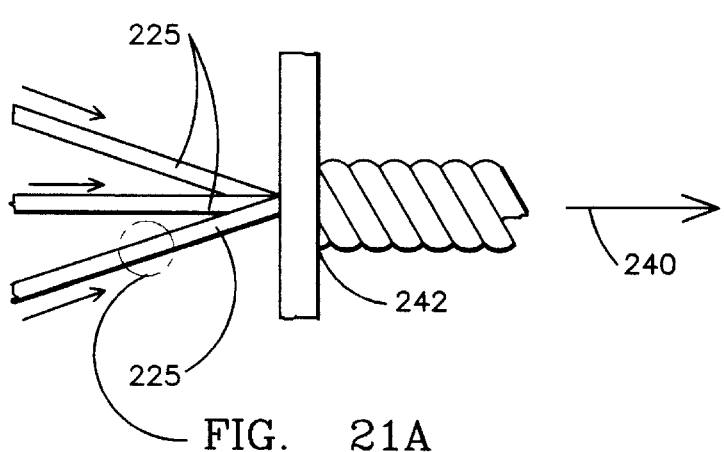
FIG. 21A
FIG. 21
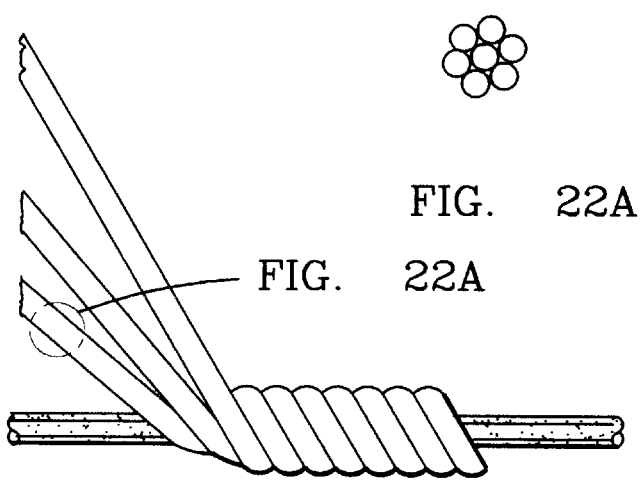
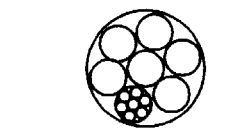
FIG. 22A
FIG. 22B
FIG. 22

FIBER OPTIC LIGHT SOURCE APPARATUS AND METHOD

This application is a continuation-in-part of application Ser. No. 08/311,129 filed Sep. 23, 1994 now U.S. Pat. No. 5,528,714 and application Ser. No. 08/277,887 filed Jul. 20, 1994 now U.S. Pat. No. 5,617,496, which is a continuation of application Ser. No. 08/065,942, filed May 21, 1993, now U.S. Pat. No. 5,333,228.

This invention relates to fiber optic lighting in general and, in particular, to a fiber optic cable light source apparatus, a method for illumination of fiber optic cable, an improved fiber optic cable and a method of manufacturing such cable.

BACKGROUND OF THE INVENTION

An optical fiber is an elongated glass or plastic filament having a core region surrounded by one or more layers of cladding, with the core having a higher index of refraction than the cladding so that light introduced at one end of the fiber will be internally reflected for transmission longitudinally within the core channel to the other end of the fiber. A fiber optic cable comprises a sheath surrounding a multiplicity of optical fibers. For further details on optical fibers, see, e.g., U.S. Pat. No. 4,744,631, the disclosure of which is incorporated herein.

Fiber optic cable finds many applications. In addition to transmitting light in a longitudinal mode, such cable also transmits light laterally. For data communications, an effort is made to minimize such lateral transmission; however, for decorative accent lighting and displays, lateral transmission is encouraged in order to provide uniform sideways lighting or "glow" over the length of the cable. An example of a fiber optic cable which enhances lateral illumination is given in Kingstone U.S. Pat. No. 5,333,228, the disclosure of which is incorporated herein by reference.

Lateral emissions from fiber optic cable are useful for area lighting and spotlighting, such as around swimming pools, walkways, signs, and for other safety and decorative accent lighting applications. In a typical such lateral emission application, one or more lengths of cable are positioned around an area or structure to be illuminated or accented, and coupled at one or both ends to receive light from a light source. Installations are frequently outdoors, involving exposure to the elements. The light source usually comprises a housing enclosing a high intensity, gas discharge lamp having an integral or separate reflector adapted to concentrate light from the lamp onto the ends of the cable fibers, and ferrule or bushing means for fixing the position of the cable relative to the lamp. A color wheel or similar movable color filter mechanism may be interposed between the lamp and the cable for control of color of the emitted light.

Such devices suffer from certain drawbacks. The contained high intensity, gas discharge lamp is a major source of heat which must be dissipated. The problem is especially acute because reflectors of conventional light sources (see, for example, the truncated ellipsoid reflector arrangement in Awai et al. U.S. Pat. No. 5,016,152) direct the light to a focal point coincident with the ends of the fibers. Concentrating the light (and, thus, the heat) at the entrance of the fibers can distort or melt the fibers. Attempts to avoid this problem include the use of integral face plates and dichroic filtering on the reflector. To remove heat from the housing, traditional approaches include the use of fans and heat vents for circulating air (see, e.g. Awai U.S. Pat. No. 4,922,385). Unshielded and fixed vent openings, however, admit rain, backsplash, ice and snow, thereby severely curtailing available outdoor housing placement opportunities.

Traditional lamp arrangements fix the bulb to the reflector either integrally at the time of manufacture, or by epoxy or similar permanent affixation means at the time of initial assembly. Where positioning of the filament relative to a focus (viz. proximal focal point of an ellipsoid reflector) is performed, separate bench alignment apparatus is employed prior to fixation. Subsequent in-field fine adjustment or readjustment is, therefore, rendered difficult. Fixing of the cable relative to the housing is conventionally accomplished using ferrules whose designs involve use of multiple screws, dowels and brackets to mount the cable tightly to the ferrule, making on-site installation awkward, tedious and time-consuming.

Known color management schemes employ pluralities of dichroic glass filters mounted on a movable platform for selective insertion between the lamp and the cable fiber ends. The usual arrangement employs a color wheel under stepper motor control, an example of which is shown in Hwang U.S. Pat. No. 5,184,253. Epoxy or similar means is used to permanently mount the filters perimetrically over apertures in the color wheel. Alternatively, the filters may be removably clamped between opposing framing elements joined by screws or other removable fasteners. Filter exchange and/or replacement is, thus, prevented, or at least, rendered difficult.

Examples of lateral illumination fiber optic cable devices used for safety or decorative illumination purposes are given in U.S. Pat. Nos. 4,933,815 and 4,763,984, the disclosures of which are incorporated herein. Such fiber optic cables or light channels utilize special methods of fabrication such as the inclusion of actinically-sensitive dyes or other light-scattering materials in the core, to aid in enhancing lateral scattering of the incident light flux.

Other approaches, which do not require specially fabricated fibers, simply bundle large numbers of fibers over each other, either individually or in helically wound groups and cover the same with a clear plastic jacket or cable. Such bundles are not efficient from the aspect of cost and illumination. The central fibers in the cable are wasted due to the fact that the central core of fibers in such cables does not contribute to the visible illumination. Moreover, the central fibers may actually detract from the lateral mode transmissions of the perimetric fibers by causing absorption and attenuation of the light directed toward the center.

SUMMARY OF THE INVENTION

It is an object of the present invention to provide improved light source apparatus and methods for illumination of fiber optic cable; especially, fiber optic cable utilized in lateral emission applications.

It is a further object of the present invention to provide fiber optic cable illumination apparatus and methods exhibiting improved coupling between a lamp and the ends of cable fibers.

It is a further object of the invention to provide such apparatus and methods enabling ready mounting of a cable to a light source housing, and ready relative positional adjustment and readjustment between a lamp and a cable.

It is a further object of the invention to provide such apparatus and methods for improved air cooling of a housing, thereby expanding opportunities for outdoor installation.

It is yet another object of the invention to provide such apparatus and methods employing an improved color management scheme, enabling rapid and convenient exchange and replacement of color filters.

It is still another object of the present invention to provide an improved fiber optic cable and method of manufacturing such cable.

These and other objects, features and advantages of the invention are provided by improved light source apparatus and methods, preferred embodiments of which are described in greater detail below. The light source has a housing enclosing a high intensity lamp, cooperative with an ellipsoid reflector to direct light from the lamp to ends of fibers of a fiber optic cable. In accordance with one aspect of the invention, coupling between the lamp and cable ends is effected so that the lamp bulb filament is located at a proximal focus of the reflector and the fiber ends are located toward the bulb, spaced beyond a distal focus of the reflector. This places the bundle of fiber ends in a defocused zone, dividing the entrance light more evenly over the fibers and avoiding intense concentration of focused light at the air/fiber entrance interface. One described embodiment, provides a platform included within the housing that enables ready adjustability in three degrees of freedom of the positional relationships of the bulb and reflection active surface. The housing advantageously has a two-piece molded hinged clamshell design, with an air-cooled system having louvers that can be selectively rotated 90° to vary direction of shielding given to underlying vent channels.

In accordance with another aspect of the invention, mounting connection between the cable and housing is established utilizing a simple ferrule structure, which employs a compressible collar and parts that thread together about the collar to capture cable fibers within the ferrule. Color management is accomplished using a color wheel rotated by a stepper motor, and including apertures provided with marginal tabs for perimetrically releasably retaining color filters therein.

In another aspect of the present invention, lateral illumination fiber optic cable is produced in which at least one optical fiber is helically wound about a central core with a transparent sheath enclosing the core and cable. Alternately, the cable may include a plurality of parallel-arranged optical fibers wound as a set about the central core in a non-overlapping pattern. Still further, the cable may be formed by winding a plurality of the sets of parallel-arranged optical fibers about the central core in a non-overlapping pattern. In still another form, a plurality of optical fibers may be arranged in a set of non-intertwined parallel fibers in a plurality of such sets of parallel fibers may be intertwined to form a cable. The plurality of sets of fibers may be wound about a central core in either a parallel or interlaced arrangement. The core is preferably a tubular member having an outer reflective surface.

Still further, the present invention may comprise the method of manufacturing the optical fiber cable including forming a plurality of sets of optical fibers with each fiber of each of the sets being arranged in generally parallel, non-interwoven relationship with each other of the fibers in the same set of fibers. The sets of fibers may be braided into an interlaced relationship and the braiding pattern controlled to establish a selected degree of bending of the fibers in each of the sets so as to control the lateral illumination from the sets of fibers. The method of manufacturing may utilize an automated machine which allows the fibers to be dispensed in either an interwoven or a non-interwoven arrangement. The manufacturing method may include forming the cable, wrapping or winding the bundles of fibers about the perimeter of a tubular core while passing the fibers and core through an extruder to apply a clear plastic jacket or sheath over the combination. The sheath material may be injected with a UV stabilizer during manufacture to protect the cable from yellowing due to sunlight, and a clear protective case may be used around the bundles to prevent the fibers from being melted during the extrusion process. Alternately, the outer sheath may be formed of an opaque with multiple cutout segments of various shapes for passing lateral illumination. The cable may also be formed with a flexible, memory retentive core so as to be bent into various shapes.

BRIEF DESCRIPTION OF THE DRAWINGS

For a better understanding of the present invention, reference may be had to the following detailed description taken in conjunction with the accompanying drawings in which:

FIGS. 12 and 13 are exploded and cross-sectional views respectively of an improved ferrule assembly;

FIGS. 16–22 illustrate various wrapping techniques for forming lateral illumination fiber optic cables.

DETAILED DESCRIPTION OF THE PREFERRED EMBODIMENTS

Figure 1:
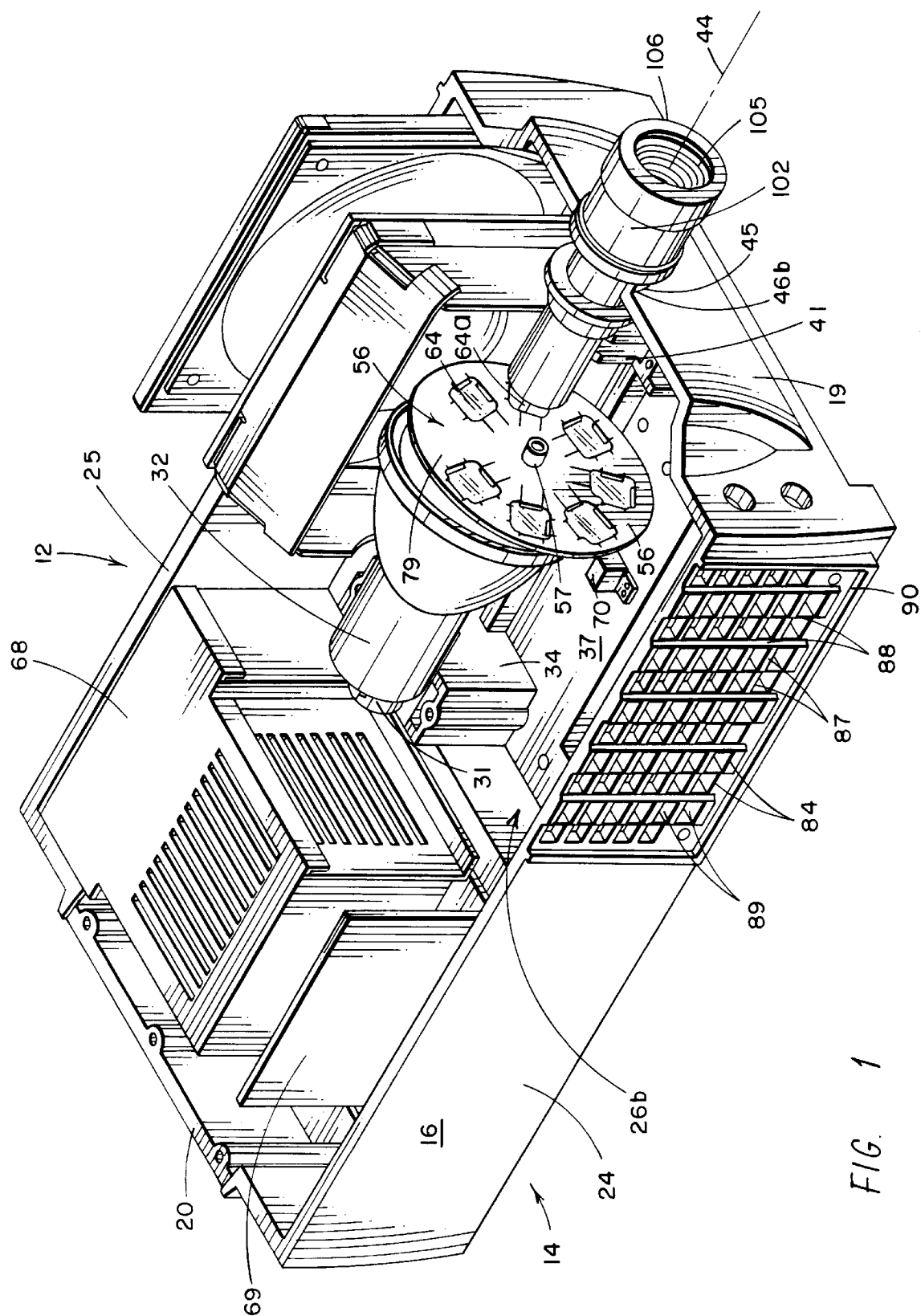
FIG. 1 is a perspective view, with portions removed, of a light source apparatus in accordance with the invention, usable in practicing a method in accordance with the invention.

A fiber optics light source 12 has a housing 14 including top and bottom halves 15, 16 (FIGS. 1 and 3), joined in clamshell fashion about a hinge 17. In the illustrative embodiment, each half 15, 16 has an open box-like construction with longitudinally spaced, laterally extending front and rear walls 19, 20 directed upwardly from corresponding front and rear edges of a rectangular base 22, and with laterally spaced, longitudinally extending side walls 24, 25 directed upwardly from corresponding side edges of base 22 and joining walls 19, 20 at corners. Facing surfaces of base 22 and walls 19, 20, 24, 25 of housing halves 15, 16 define respective upper and lower hollow portions 26a, 26b which combine to form an internal cavity within the structure of housing 14, when halves 15, 16 are brought into superposed positions, with walls 19, 20, 24, 25 of half 15 brought into alignment atop walls 19, 20, 24, 25 of half 16. For convenience of manufacture, halves 15, 16 may be identical parts made, for example, of cast aluminum. Alternately, either the upper half 15 or lower half 16 may be constructed as a lid or platform with the other half housing formed as a box-like container.

Figure 2:
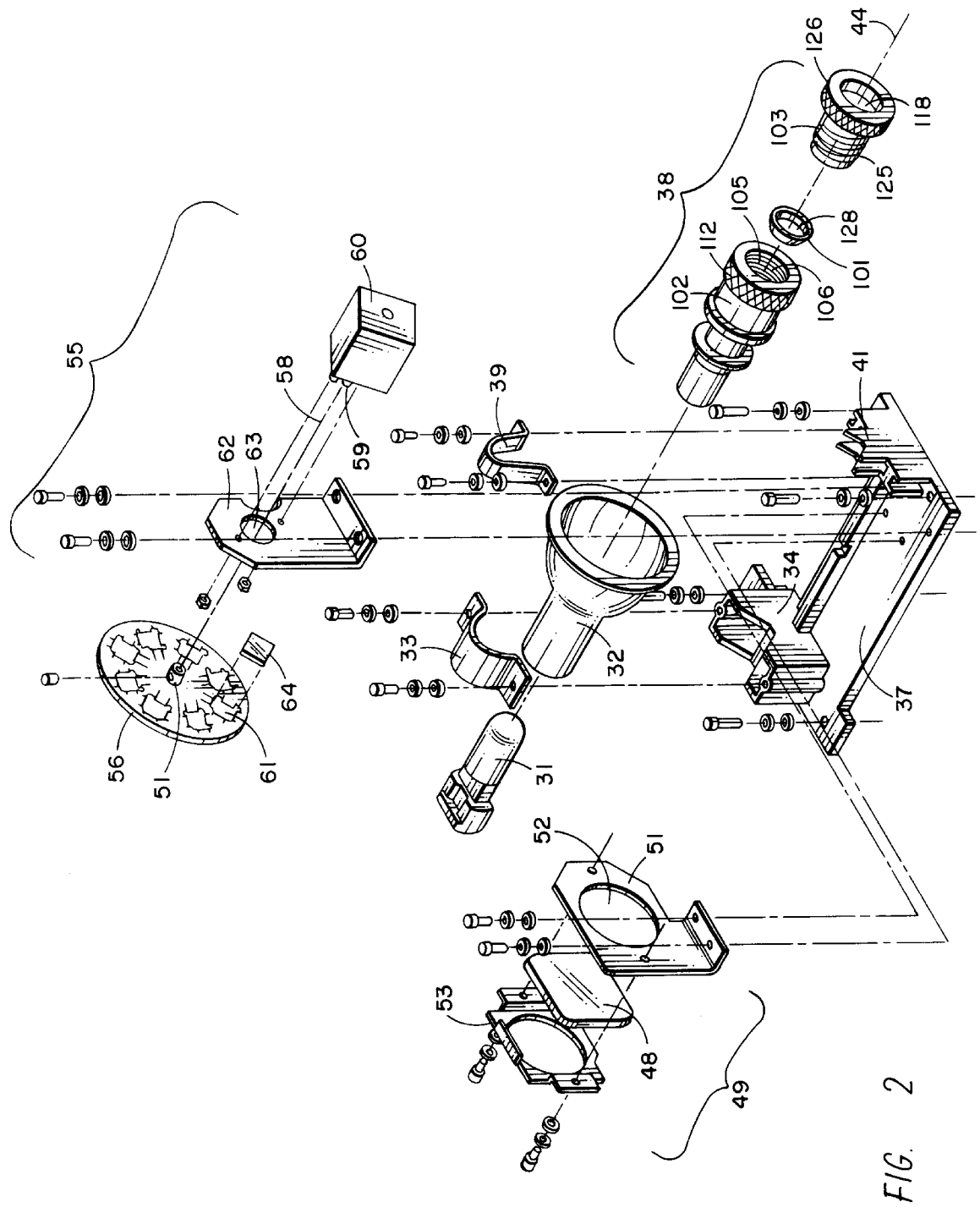
FIG. 2 is an exploded view showing components of the optical assembly of the light source apparatus of FIG. 1.

Housing 14 serves as a protective enclosure for components of an optical system 30, shown in FIGS. 1 and 2. System 30 comprises a high intensity, gas discharge lamp 31 positioned within a reflector 32 and mounted by means of a first clamp 33 atop a first V-block 34 of an optical bench 37. A ferrule 38 is mounted by means of a second clamp 39 atop a second V-block 41 of the same bench 37. Bench 37 is mounted on base 22 within cavity portion 26b of housing bottom half 16, with V-blocks 34, 41 located in longitudinally spaced positions for alignment of bulb 31, reflector 32 and ferrule 38 along an optical axis 44, with ferrule 38 extending through an aperture 45 located in the front of housing 14. Aperture 45 is formed by upper and lower arcs 46a, 46b which ar respectively formed on front walls 19 of housing halves 15, 16, and which are brought into opposing positions when halves 15, 16 are brought together to close the internal cavity of housing 14.

Optical system 30 also includes a plate of heat absorbing glass 48 which is mounted general orthogonal to axis 44, between reflector 32 and ferrule 38 on bench 37 by means of a bracket assembly 49. Assembly 49 may comprise a vertically extending, planar support 51 having an aperture 52 over which plate 48 is held by means of a marginal clamp 53; or may, alternatively, have a unitary construction comprising a single apertured support member including marginal bends defining a pocket into which plate 48 can be received.

A color wheel assembly 55 (FIG. 2) includes a color wheel in the form of a disk 56 having a central hub 57 mounted for rotation about a rotary axis 58 on a drive shaft 59 of a stepper motor 60. A plurality of apertures 61 are formed at angularly spaced intervals, circumferentially about disk 56. Motor 60 is mounted on bench 37 to one side of axis 44 by means of a bracket 62. Shaft 59 extends through a bracket opening 63 and positions disk 56 between plate 48 and ferrule 38, generally orthogonal to axis 44. A different color dichroic glass filter 64 is associated with each aperture 61, and disk 56 is dimensioned, configured and adapted so that different positions of stepper motor shaft 59 will bring different filter color filter 64a into alignment with axis 44. A notch 66 in bracket 62 serves to avoid obstruction by bracket 62 of the beam from lamp 31 passing through a selected filter aperture 61. Power for lamp 31 and motor 60 (viz. transformer, ballast, etc.) is supplied through electrical connection with a power supply 68, mounted on base 22 toward the rear of cavity portion 46b. Positioning control for stepper motor 60 is provided by electrical connection to a control circuit 69 housed in the same general vicinity (see FIG. 1). A position sensor 70 is located adjacent the outer edge of disk 56 to provide a "zero" angular positional reference for stepper control.

Figure 4:
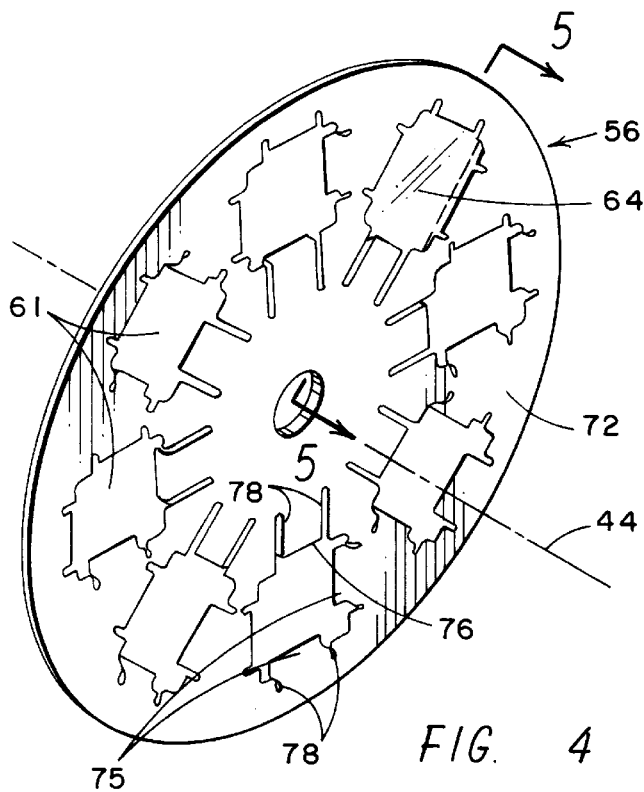
FIG. 4 is a front perspective view of the color wheel element of FIGS. 1 and 2.
Figure 5:
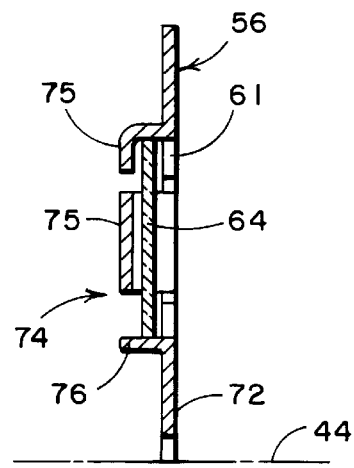
FIG. 5 is a fragmentary section view, taken along the line 5—5 of FIG. 4.

Details of one embodiment of color wheel disk 56 are shown in FIGS. 4 and 5. As illustrated there, a unitary circular main body 72 has eight rectangular apertures 61 formed therein at 45° equiangular spacings, with peripheral edges bent (e.g., by metal stamping) to provide spring-loaded pockets 74 into which filters 64 can be inserted. Each aperture 61 is bordered at its radial and outer edges by a normal, then parallel to the disk directed L-shaped tab 75 (FIG. 5) and at its inner edge by a normal to the disk directed tab 76. The normal directed tab portions provide platforms against which corresponding edges of a filter 64 can be rested. The parallel directed portions act as stops. The aperture edges have slits 78 on either side of the tabs 75, 76 to cause the tabs to yield resiliently for placement and retention of the filters 64. It is advantageous for stepper performance to space the apertures 61 at equal angles about the center of disk 56; however, it may be desirable to leave one designated aperture area 79 (FIG. 1) uncut, to serve as a shutter for blocking light from reaching the cable.

Figure 6:
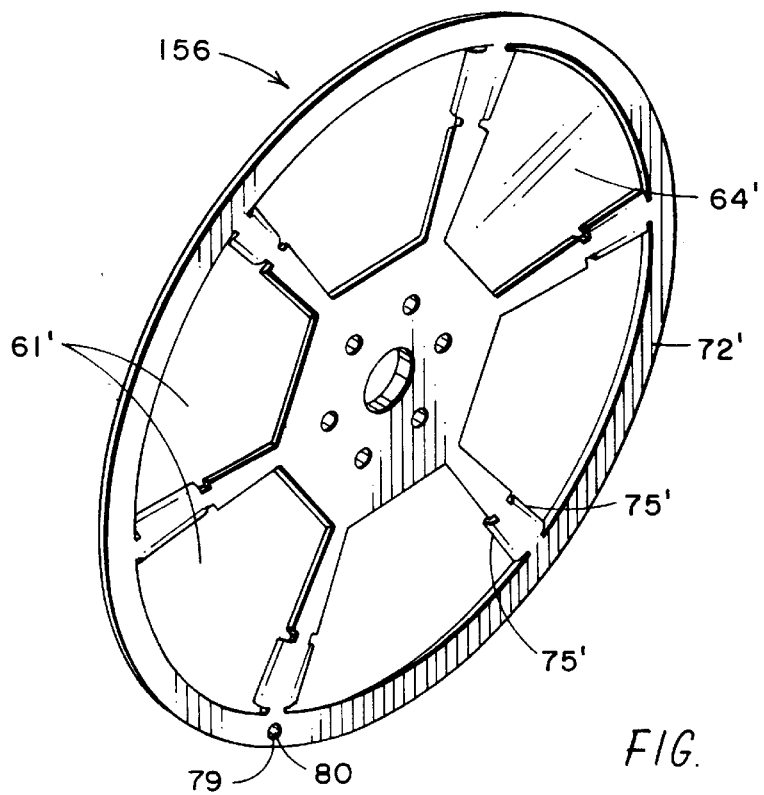
FIG. 6 is a view, as in FIG. 4, of a modified form of the color wheel element.

FIG. 6 illustrates a modified color wheel disk 56' having a main body 72' of 26-gauge or similar aluminum stamped metal, and formed with six larger apertures 61' of generally trapezoidal shape for accommodating correspondingly trapezoidal shaped filters 64'. Like disk 56, disk 56' is provided with bent radial edge tabs 75' and slits 78' to provide spring-action framing for holding the filters in place. Disk 56' is cut to also provide a raised index tab 79 and associated opening 80 peripherally of its outer circumference. Depending on the type of sensor 70 (FIG. 1) employed, either of these can be used to indicate a known reference "zero" angular position of disk 56'. The projection of tab 79 above the disk surface can be detected, for example, by a mechanical or visual sensor; or, alternatively, an LED or other light source directed at the disk periphery can be viewed through opening 80 detected by an optical sensor.

Cooling of optical system 30 is provided by drawing air through the front of the housing internal cavity, from vent openings 84 located on one side of housing 14 to vent openings 85 located on the other side of housing 14, across optical bench 37. The front of reflector 32 is left open and spacing is provided between reflector 32 and plate 48, between plate 48 and disk 56, and between disk 56 and ferrule 38, to provide gaps through which the generally orthogonally directed air can flow.

Figure 3:
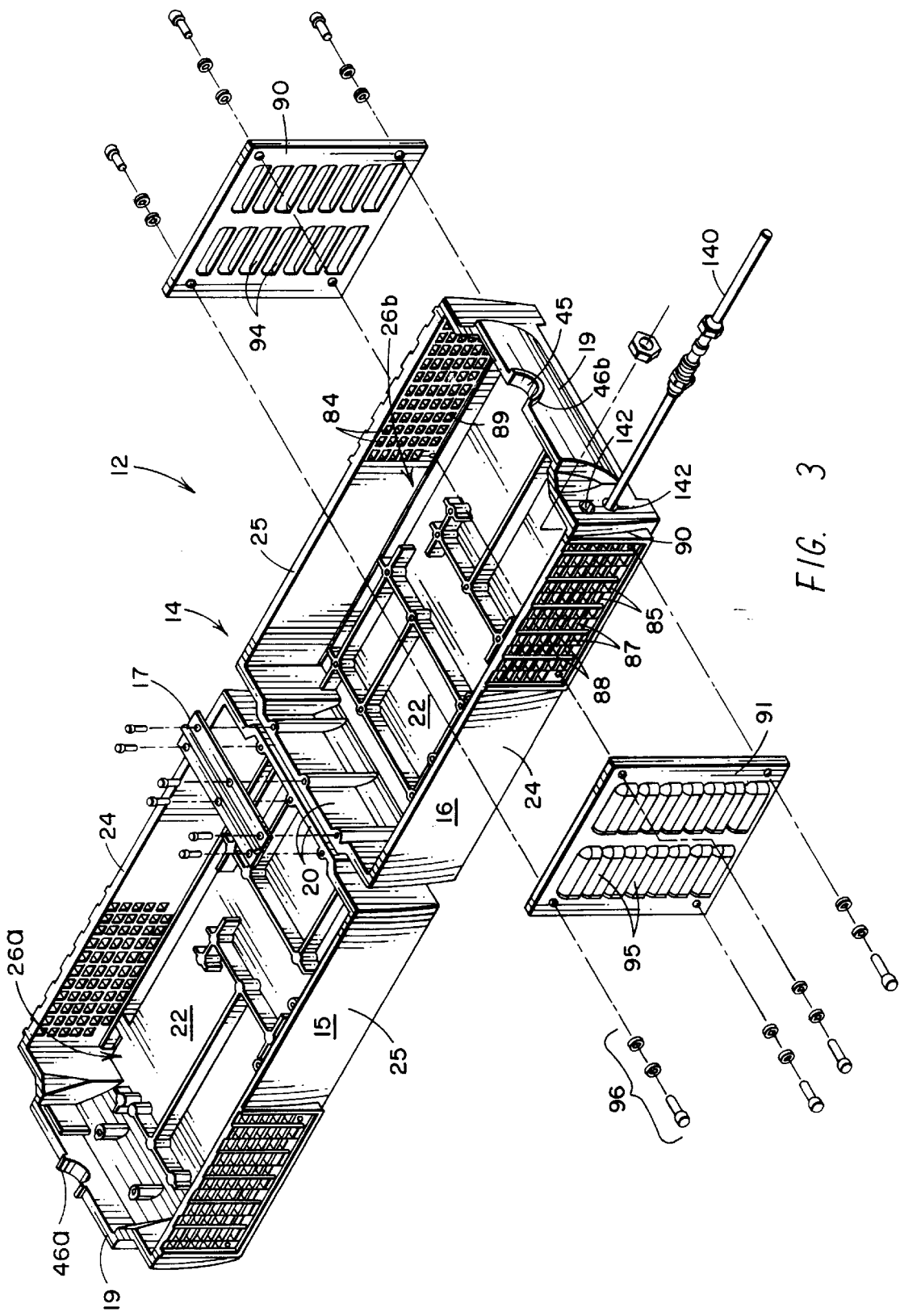
FIG. 3 is an exploded view showing the clamshell housing construction and rotational louver design of the same light source.

As shown in FIGS. 1 and 3, each housing half 15, 16 includes a half-square grillwork of heat conductive fins 87 and cross-fins 88 defining laterally directed air channels 89 for passing the air. The half-squares of top half 15 mate with the corresponding half-squares of bottom half 16 when the clamshell structure of housing 14 is closed about hinge 17, providing aligned opposing square matrix arrays of channel 89 having an external square lip 90 into which identical square louver panels 91, 92 are fastened, as indicated in FIG. 3. Each panel 91, 92 includes a series of openings 94 all shielded by skirts or awnings 95 to direct flow to or from a same one direction (the down direction in FIG. 3) parallel to the plane of the panel. Panels 91, 92 are symmetrical about horizontal and vertical centers and secured at their corners within lips 90 by removable fasteners 96, so that they may be attached over the channels 89 in any selected one of four angular orientations, each rotated 90° from the other about the panel center and in the panel plane. Thus, panels 91, 92 not only serve as means for holding the top and bottom halves 15, 16 in their superposed cavity-closed positions, but provide selective directional shielding that can be oriented, as desired, to best protect the housing interior from rain, backsplash and the like.

Figure 7:
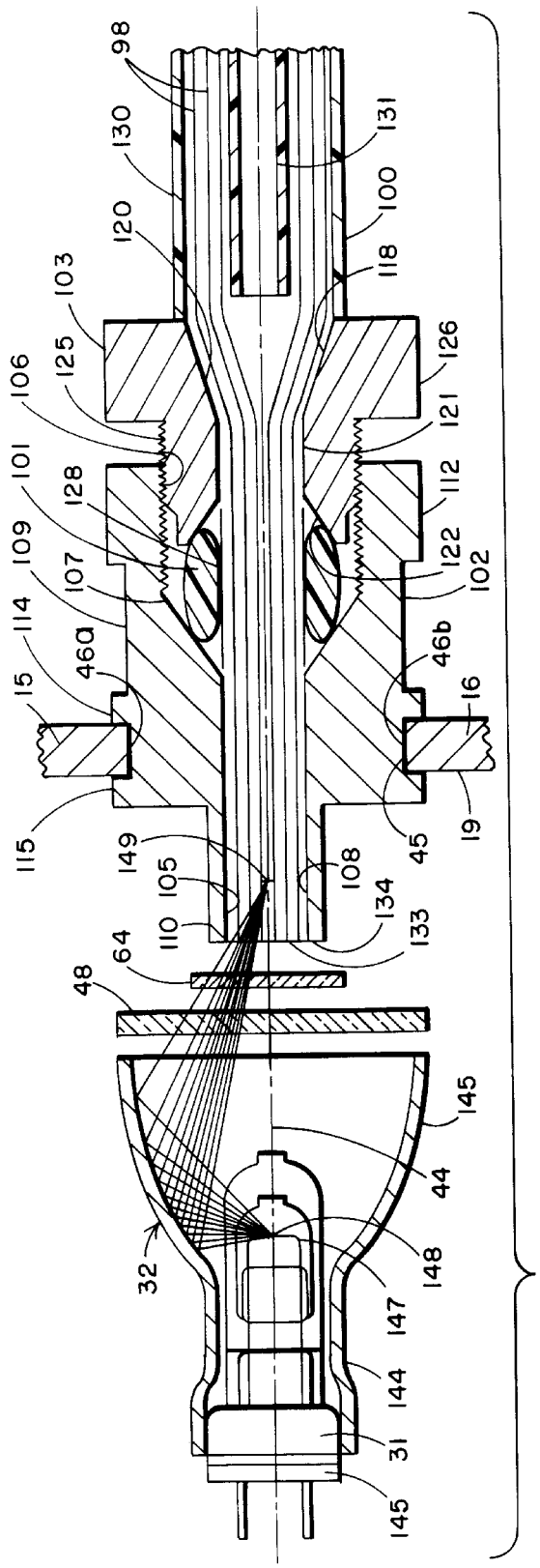
FIG. 7 is a longitudinal section view of the lamp and fiber coupling elements of the assembly of FIG. 2.

As illustrated in FIG. 7, ferrule 38 serves to couple the ends of fibers 98 of a fiber optic cable 100 within housing 14 to receive illumination from lamp 31 and reflector 32. One form of ferrule 38 (shown in exploded view in FIG. 2 and in cross-section in FIG. 7) is of simple construction including a compressible collar in the form of an elastomeric grommet or stopper 101, and first and second parts in the form of tubular sections 102, 103 that can be inter-engaged about the grommet to capture the fibers with ferrule 38.

Section 102 of an exemplary ferrule 38 (see FIGS. 1, 2, and 7) has a central bore 105 with a threaded uniform larger diameter front portion 106, a continuously rearwardly and inwardly tapered intermediate portion 107, and a smooth uniform smaller diameter rear portion 108. Section 102 has a stepped outside contour with a generally uniform larger diameter front portion 109 and a reduced, second uniform smaller diameter rear portion 110. The foremost part of front portion 109 is slightly enlarged and provided with a knurled, hand-grippable outer surface 112. The rear part of front portion 109 is provided with two flanges 114, 115 which are longitudinally spaced by an interval to match the longitudinal direction thickness of walls 19 of housing halves 15, 16 at arcs 46a, 46b. The outside diameter of front portion 109 in the interval between flanges 114, 115 is chosen to match the inside diameter of aperture 45 formed by the joined arcs 46a, 46b. The outside diameter of rear portion 110 is chosen to cooperate with the size and position of V-notches of front V-block 41 of bench 37 so that positioning section 102 within aperture 45, with flanges 114, 115 abutting opposite faces of walls 19 of joined halves 15 and rear portion 110 resting in the V-notches of V-block 41, will align section 102 longitudinally of housing 14, with bore 105 coincident with optical axis 44.

Section 103 has a central bore 118 with a continuously rearwardly and inwardly tapered front portion 120, a smooth uniform diameter intermediate portion 121, and a continuously rearwardly and outwardly tapered rear portion 122, the tapered portions automatically self-centering the fiber optical cable in the ferrule. Section 103 has a stepped outside contour with a threaded uniform diameter rear portion 125 and an enlarged front portion 126 which is provided with a knurled, hand-grippable outer surface. The outside diameter and threading of rear portion 125 of section 103 is chosen to match and be threadingly engageable with the inside diameter and threading of front portion 106 of bore 118 of section 102. The inside diameter of intermediate portion 121 may be chosen the same as, or greater than, the inside diameter of rear portion 108 of bore 105 of section 102. Grommet 101 is provided with a central opening 128, which may be about the same as, or slightly larger than, the matching diameters of rear portion 108 and intermediate portion 121. Grommet 101 may have a continuously varying, increasing then decreasing outside diameter, with a greatest dimension less than the inside diameter of front portion 106 of bore 105.

Referring to FIGS. 12 and 13, a preferred version of a ferrule assembly 200 includes an outer protective shell including a first tubular section 202 and a second tubular section 203. Section 202 is substantially identical to section 102 of exemplary ferrule 38 described above and the reference numbers used in describing section 102 will be understood to refer to substantially identical elements of section 202. Reference may be had to the description of ferrule 38 for a description of the common elements. One additional element is a waterproof elastomeric gasket 204 which circumscribes rear portion 110 and may be used where the light source 12 is employed in a damp environment.

The ferrule assembly 200 includes an internal clamp assembly 205 comprising a double ended connector 206 having an end 207 with threads adapted and sized to engage the inner threads in section 202 in order to couple the connector 206 to section 202. An opposite end 208 of connector 206 is formed over a partial extent with other threads adapted and sized to mate with internal threads in connector cap 209. The distal portion 210 of end 208 is not threaded and is longitudinally slotted to form a plurality of circumferentially spaced, flexible fingers 212. The connector cap 209 has an internal radial taper to a reduced diameter opening 213 so that as cap 209 is threaded onto end 208, the internal taper compresses fingers 212 in a radial direction to clamp a fiber optic cable inserted through ferrule assembly 200. A compressible elastomeric washer 214 fits within fingers 212 to protect the cable and to distribute the force exerted by fingers 212. It will be appreciated that the ferrule assembly 200 automatically centers a fiber optic cable along a longitudinal axis 216 of the assembly. The connector 206 preferably includes a central, enlarged, multifaceted segment 215 for receiving a wrench or other tool to facilitate tightening of the threaded ends of the connector with respect to cap 209 and section 202. The cap 209 is formed with an outer faceted configuration identical in size to segment 215 for use in tightening cap 208 onto connector 206. An outer end 215 may be rounded with a configuration similar to the internal taper.

The second tubular section 203 forms a connector cover and is used to protect connector 206. Cover section 203 is a tubular, slide-on cover having an inner diameter so as to frictionally engage the apexes 217 formed on faceted segment 215 of connector 206 and the apexes 218 on cap 209. Cover section 203 may also include a knurled section 219 for manually installing the cover over the connector. The end 220 of cover section 203 abuts against section 202.

In operation for coupling a fiber optic cable (which may be of any type, but for purposes of illustration, is taken to be a type such as described in Kingstone U.S. Pat. No. 5,333,228), a portion of outside sheath 130 and inside tubing 131 of cable 100 is stripped away, exposing free lengths of fibers or fiber bundles 98 (hereafter "fibers"). Fibers 98 are passed through bore 118 of ferrule section 103, through opening 128 of grommet 101, and into bore 105 of ferrule section 102, so that the ends 133 of fibers 98 are flush with and fill the exit opening 134 of bore 105. Section 102 is placed through arc 46b of bottom housing half 16 and secured with clamp 39 within V-block 41. Sections 102 and 103 are threaded together, to compress grommet 101 between the oppositely tapered bore portions 107, 122 and about the fibers 98. The sequence of insertion and threading steps may vary to suit individual preference. Once cable 100 is secured with fiber ends 133 in desired position relative to exit port 134, housing 14 may be closed and arc 46a brought into opposing relationship to arc 46b, about section 102. Louver panels 90, 91 may then be oriented as desired and fastened over the square matrix arrays of air venting channels 89 formed by superposed housing halves 15, 16. Other mechanisms (not shown) may also be employed to lock the two halves 15, 16 in their housing closed positions.

Ferrule 98 may be provided wit different sized inside diameter bore portions 108 to accommodate different sized fibers or different numbers of fibers. Alternatively, ferrule 98 may be provided with one or more tubular adapter sleeves (not shown), having outside diameters matching the inside diameter of bore portion 108 and inside diameters chosen to match the outside diameters of different bundle sizes of fibers 98 of different sizes or types of cables 100. Also, whether and at what point an outer sheath (e.g., sheath 130) or non-fiber internal member (e.g., tubing 131) is cut back to expose the free fibers 98 may vary with individual installer preferences and types and sizes of cable. It is noted, too, that a usual way to connect power and/or control lines to a fiber optic light source is by an electrical wiring cable or conduit 140 (see FIG. 3) that is separate from the fiber optic cable; however, as disclosed in the '228 patent, the hollow of tube 131 of a cable 100 of the '228 patent type may optionally be used to carry wiring to or from a remote location within the cable itself. Thus, for example, a cable 100 illuminated by light sources at both ends may have power and control wiring to a first end light source delivered in the usual way by a conduit 140, but power and control wiring delivered to a second end light source through a conduit path provided by the hollow of tubing 131. For this reason, to give flexibility for various installation setups, housing 14 is providing with wiring pass-through 142 on the front of housing 14, in proximity to the cable entrance point 45. One or more pass-through openings can be provided on the wall 19 of each half 15, 16. Punch-out disks or other removable plugs may optionally be used to close-off unused ones of the openings.

The use of ferrule assembly 200 is substantially the same as for ferrule 38 as described above except that the connector 206 and cap 209 provide primary clamping mechanism for holding the optical fiber cable. The connector 206 is initially threaded into section 202 and then the cable is fed through cover 203, cap 209, washer 214 and assembled connector 206 and section 202. Cap 209 is then threaded and tightened onto connector 206 with washer 214 seated within the connector. The tightened cap compresses fingers 212 into washer 214 tightly gripping the cable. The cover 203 is slid into place as shown in FIG. 13. The cable can then be terminated in a conventional manner and the ferrule assembly 200 seated in the light source 12 as described above.

Figure 8:
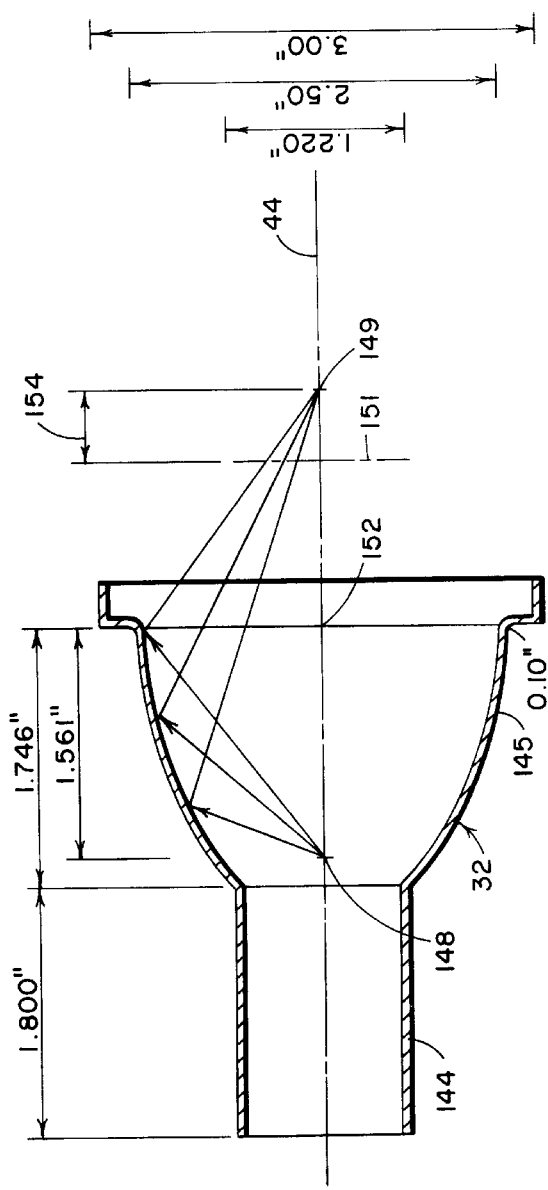
FIG. 8 is a schematic view helpful in understanding the light coupling arrangement in accordance with the invention.

Lamp 31 may be a commercially available high intensity, gas discharge lamp such as a Thorn ArcStream 4000 metal halide lamp. As shown in FIGS. 7 and 8, reflector 32 is formed with a hollow cylindrical rear section 144 adapted to receive the base 145 of lamp 31 in axial alignment with optical axis 44. A front section 145 of reflector 32 has a generally truncated ellipsoidal shape. Both sections 144, 145 are formed rotationally symmetrical about an axis coincident with optical axis 44. Lamp 31 is positioned so that its electrode discharge 147 will be centered at a proximal focal point 148 of the ellipsoidal reflection surface of section 145. This will focus the light emitted by lamp 31 toward a distal focal point 149, spaced from focal point 148 by a given distance determined by well-known mathematical relationships. In a preferred mode of operation, ferrule 38 is positioned relative to reflector 32 so that exit point 134 will be located relative to focal point 149 by an amount 154 sufficient to place the fiber ends 133 at a defocused plane 151 rearward of point 149, between point 149 and the center 152 of the ellipse. Preferred positioning places the ends 133 at a distance from point 149 to bring the diameter of the spot size of the defocused beam at plane 151 equal to or slightly larger (viz. within 25%) of the width of the fiber end bundle. For a standard bundle of fibers 98 having 14 bundles of 7 fibers of 0.750 mm diameter each, a ±2 mm (±2–3 mm fiber diameters) axial positioning variance was found acceptable. Dimensions for one implementation of a reflector 32 are given in FIG. 8. Suitable reflectors include a plain aluminum reflector machined by a spinning tool and later metalized; a glass reflector coated with a reflective material; and a cast aluminum reflector including built-in heat sink fins and mounting holes.

Figure 9:
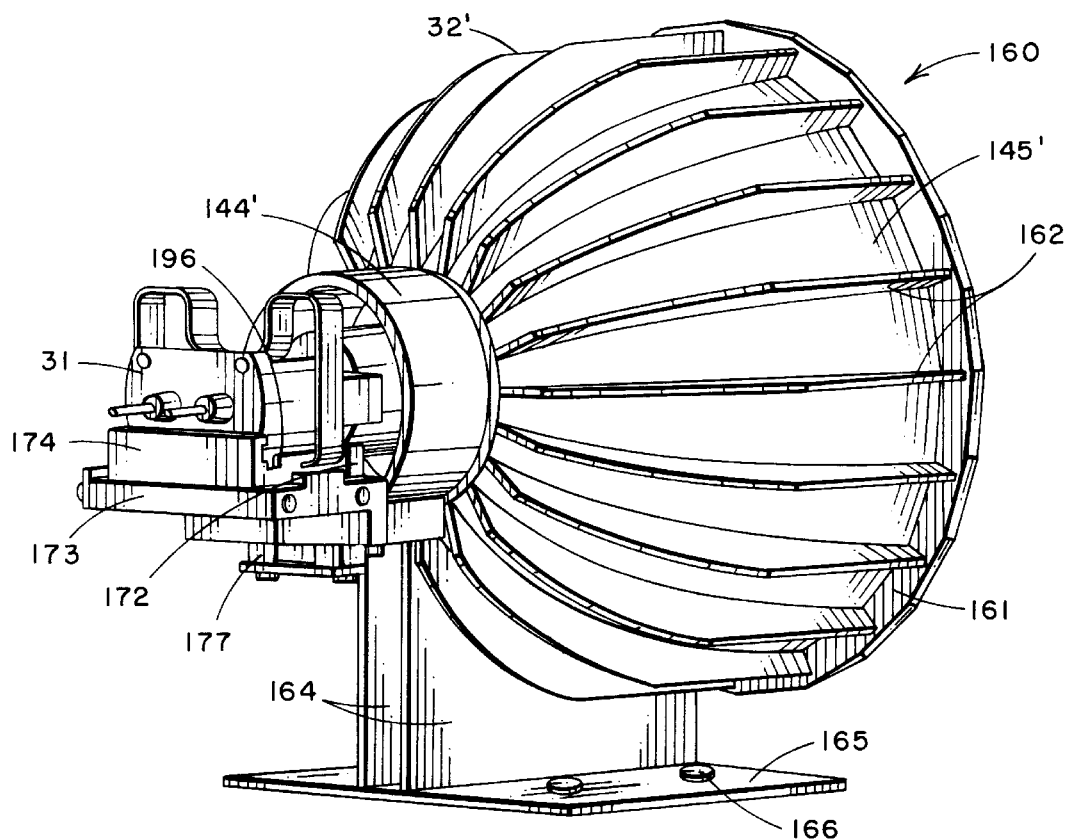
FIG. 9 is a rear perspective view showing another embodiment of the reflector element of the apparatus.
Figure 10:
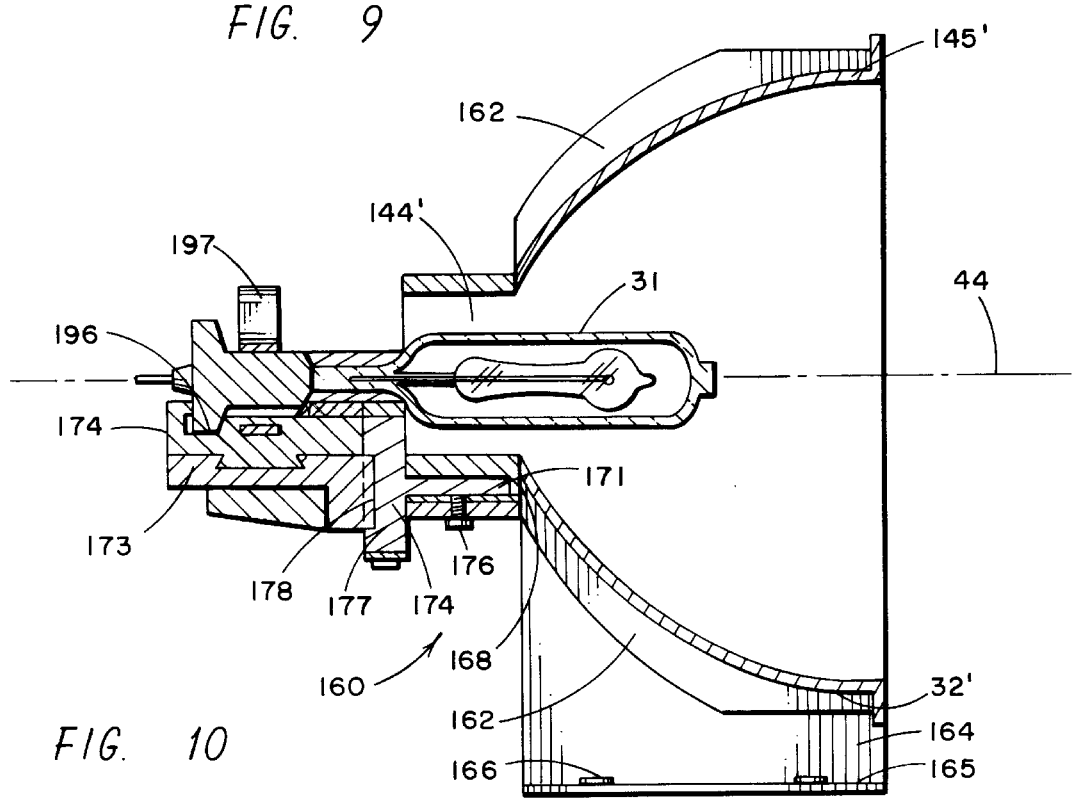
FIG. 10 is a vertical section view, taken along the line 9—9 of FIG. 9.
Figure 11:
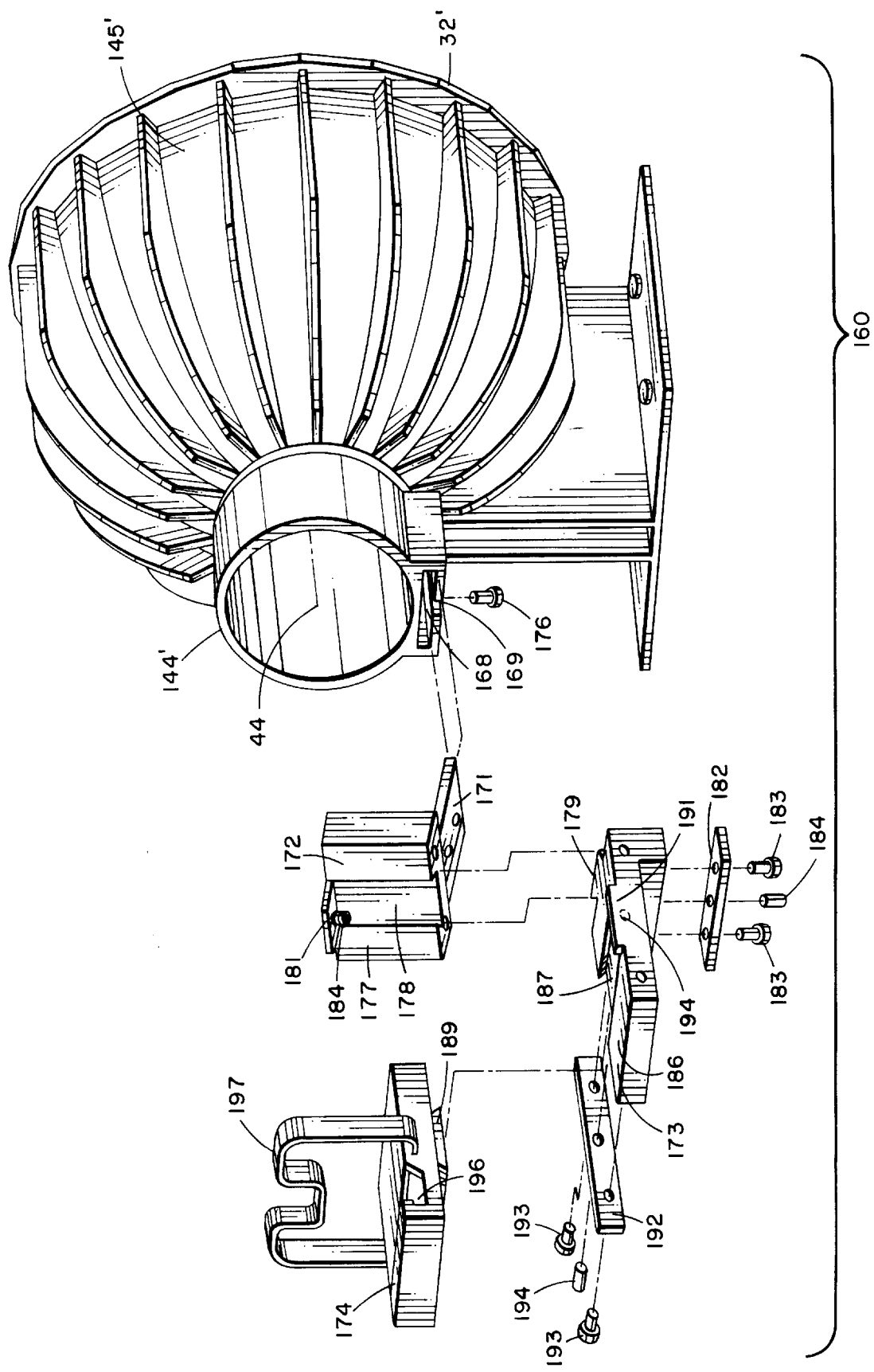
FIG. 11 is an exploded view, showing the components of the reflector embodiment of FIGS. 9 and 10.

An example of the latter kind of reflector is given in FIGS. 9–11 which show a reflector assembly 160. As before, reflector 32' includes a section 145' having a generally truncated ellipsoid internal reflecting surface. The exterior of section 145' includes, as before, a front radially extending circumferential flange 161. In addition, however, section 145' now also has a series of spaced, axially extending heat dissipating fins 162, which assist in the air cooling process, described above. Furthermore, a pair of vertical, laterally spaced legs 164 extend from the underside of section 145' to a horizontal base 165 that may be mounted by fastening means 166 to optical bench 37. Likewise, as with previous embodiments, reflector 32' includes a cylindrical rear section 144' having a hollow into which lamp 31 is inserted. In departure from prior embodiments, however, section 144' is configured to cooperate with additional elements enabling x-, y- and z- direction positional adjustments between lamp 31 and reflector 32'.

The underside of section 144' includes a rearwardly open slot 168 aligned with the reflector axis (and, thus, the optical axis 44). A slit 169 runs centrally along the bottom of slot 168. Mounted within slot 168 is a longitudinal tab 171 of a first of three nested lamp x-, z- and y- direction adjustment lamp-mounting components 172, 173, 174. Tab 171 of x-direction adjustment component 172 is movable within slot 168 to vary the x-directional positioning of all three nested components 172, 173 and 174 relative to reflector section 144'. A releasable locking screw 176 passed through slit 169 into threaded engagement with tab 171 serves to lock the x-direction position after adjustment. Component 172 has a vertically extending planar rear portion 177 including a vertically extending, dovetail cross-sectioned slot 178 into which a complementary vertically extending, dovetail cross-sectioned tab 179 of z-direction adjustment component 173 is inserted. Tab 179 of component 173 is movable within slot 178 to vary the z-directional positioning of the nested components 173, 174 relative to component 172 (and, thus, relative to reflector section 144'). The top of slot 178 is closed by an integral stop 181. After placement of tab 179 within slot 178, the bottom of slot 178 is closed with a laterally extending horizontal plate 182 which fastens to the base of component 173 by screws 183. A spring 184 is positioned in a recess on the undersurface of stop 181, and a z-direction adjustment screw 184 threaded centrally through plate 182 into abutment with the bottom of tab 179, serves to lock the position of tab 179 upwardly against the downward bias of spring 184. Component 173 has a horizontally extending planar rear portion 186 including a horizontally extending, dovetail cross-sectioned slot 187 into which a complementary horizontally extending, dovetail cross-sectioned tab 189 of y-direction adjustment component 174 is inserted. Tab 189 of component 174 is movable within slot 187 to vary the y-directional positioning of component 174 relative to component 173 (and, thus, relative to component 172 and reflector section 144'). One end of slot 187 is closed by an integral stop 191. After placement of tab 189 within slot 187, the other end of slot 187 is closed with a longitudinally extending vertical plate 192 which fastens to the side of component 173 by screws 193. A spring 194 is positioned in a recess on the inside surface of stop 191, and a y-direction adjustment screw 194 threaded centrally through plate 192 into abutment with the adjacent side of tab 189, serves to lock the position of tab 189 upwardly against the opposing bias of spring 194. Component 174 is configured with a lateral recess 196 dimensioned and configured to receive a corresponding enlargement of the base of lamp 31. The remainder of the upper surface of component 174 is contoured to match the abutting contour of lamp 31, and a spring clamp 197 is provided to serve as a hold-down to hold lamp 31 in fixed position for x, y- and z-adjustment according to positioning set for component 174. Components 172, 173 and 174 serve to suitably adjust the lamp 31 to give maximum discharge at the proximal focal point 148 of the ellipsoid reflection surface. Once desired positioning is established, a preferably subsequently removable locking material is applied to set the adjustment screw positions.

Figure 14:
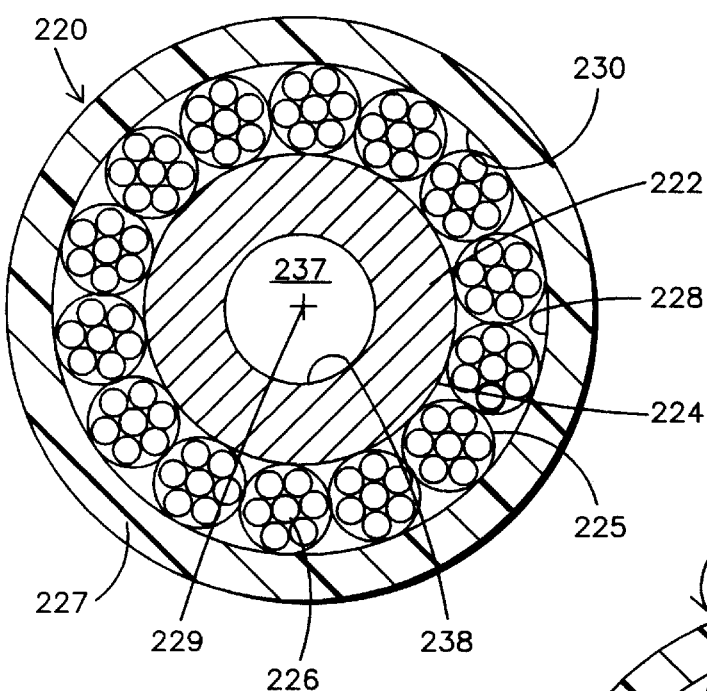
FIGS. 14 and 14A are cross-sectional views of exemplary fiber optic cables.
Figure 14A:
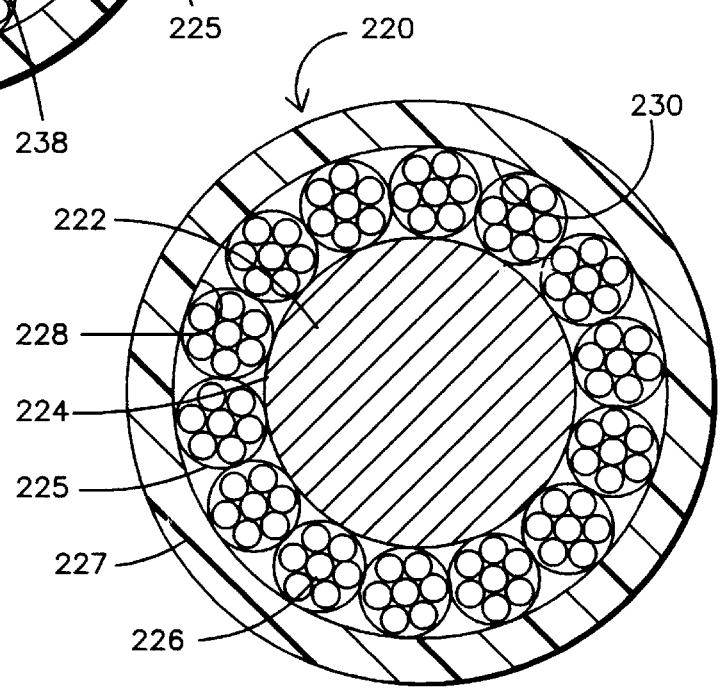

Referring now to FIG. 14 and 14A, there is shown a lateral illumination fiber optic cable device 220 which includes a central core member 222 in the form of a longitudinally extending, hollow tube or a solid, flexible material. While it is preferable that the member 222 have a circular cross-section, the member 222 could have an oval or other shaped cross-section as will become apparent. The member 222 is made of a reflective material, or is coated, or otherwise associated with reflective material to impart light reflectance to an outer surface 224. A plurality of bundles 225 of optical fibers 226 are distributed circumferentially about the perimeter of the core member 222 to extend axially in contact with the reflective surface of 224. While the bundles 225 may be uniformly distributed, it may be desirable to establish a non-uniform, circumferential distribution to impart particular light patterns to the device 220. While it is generally preferable to utilize a reflective core to increase lateral light output, it may be appropriate in some instances to use a less reflective core simply to disperse the fiber optic bundles to create a large diameter, more visible cable device. It may also be desirable to wrap the bundles 225 about a core member 222 formed of a communication cable, such as an RT57 cable, or other type of large cable so that the core member 222 has a dual function of dispersing the bundles 225 (or individual optical fibers) and carrying electrical signals.

The bundles 225 are, in turn, covered with a clear plastic tubing or casing sheath 227 which has an inside surface 228 in contact with a radial extremities of the bundles 225. The sheath 227 runs longitudinally, coaxially of the core member 222, with the bundles being distributed about a common longitudinal axis 229 in an annular region formed in the space between the surfaces 224 and 228. The bundles 225 may be laid straight, or helically wound about core member 222, in the axial direction.

In one method of manufacture, commercially available bundles 225 of helically twisted fibers 226 are cabled, wrapped or wound over a white or silver reflective PVC plastic tubing or a solid core member 222, then passed through a plastic extruding machine, which will lay a clear PVC plastic tubing jacket 227 over the bundle wrapped core to serve as a protective outer shell. A UV stabilizer may be injected into the tubing 227 as it is being formed to protect the cable from yellowing due to sunlight, and a cape 230 of clear Mylar® or Teflon® tape is wound around the outside diameter of the bundle layer to keep the bundles 225 from unraveling during the cabling process and to prevent the fibers 226 from being melted during the process of extruding the jacket 227 over the bundle wrapping. For enhancement of the reflectance, or as an alternative to using a reflective core member 222, the outer surface of member 222 may be wrapped with a layer of aluminum foil or Mylar® (foil side out) tape 231 or coated with titanium dioxide or white reflective paint.

Figure 15:
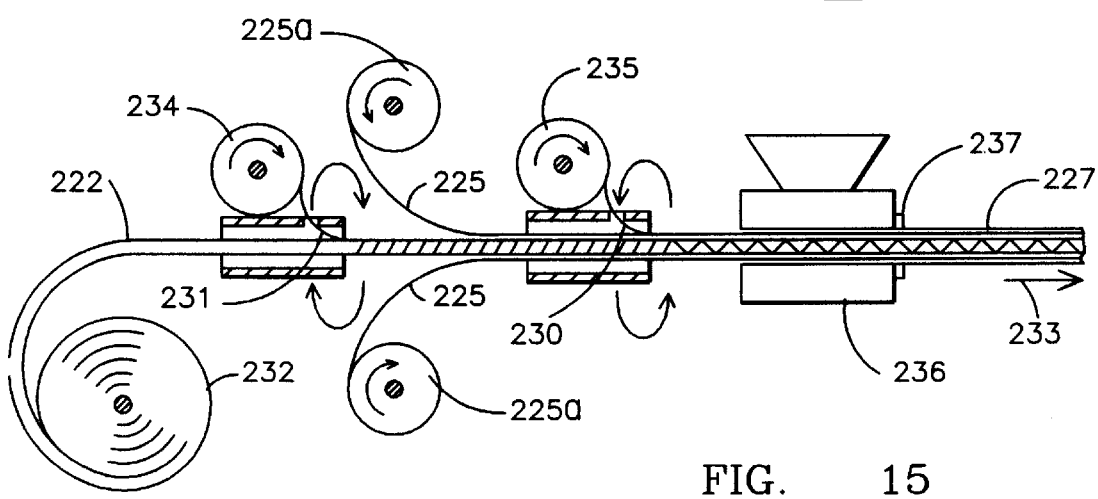
FIG. 15 is a schematic view of a manufacturing process suitable for forming a lateral illumination cable.

One method of manufacturing the cable 220 is illustrated in FIG. 15. A length of a flexible core member 222 is drawn off a roll 232 and fed in an axial direction 233. A tape dispenser 234 is rotated about member 222 to wrap a length of reflective tape 231 helically about member 222. A plurality of fiber bundles 225 are then laid longitudinally, at equal angular intervals, along the reflective tape covered member. A second tape dispenser 235 is then rotated about member 222, in a direction counter to the rotation of dispenser 234 to wrap a length of clear or tinted protective tape 230 helically about the bundle member 222. The protective tape wrapped member is then fed centrically through an extruder 236 having a die 237 which forms a jacket 227 over the bundle wrapping, thereby producing the finished cable 220. The use of a tinted or colored protective tape provides a means for causing the finished cable to glow in a selected color, e.g., red. There are numerous applications where a single color is desired, such as in marking aisles in aircraft or theaters. By using a tinted tape, a desired color can be obtained without using a filter (such as filter wheel 56) between the light source and cable. Light output of the cable, i.e., the lateral illumination, can be increased without increasing source intensity since the unfiltered light is not attenuated by the intervening filter before introduction into the cable. Cable coloring can also be obtained by using a clear tape 230 in combination with a colored outer jacket 227. This latter method may be preferred since adding color to the plastic extruder is simply a matter of mixing a tinting compound into the loose plastic material of the extruder 236. The color of the jacket 227 is controlled by adjusting the amount of tint (or color) added to the extruder. This is particularly of benefit in the case of red colors due to the fact that the most commonly used light sources in the industry for fiber optic lateral illumination cable are metal halide. Metal halide light sources have much of the infrared spectrum removed from the light output and thus are not capable of generating a true red color on a fiber optic lateral illumination cable. Red is one of the most popular colors in neon tube lighting applications and the invention of a red fiber optic opens a large potential market for fiber optic cable.

Applicant has discovered that a further improvement in light output levels of lateral illumination cable can be obtained by placing a highly reflective covering over the cable exiting the light source for an initial distance of about one to two meters. More particularly, tests utilizing light meters at various intervals over the length of a fiber optic lateral illumination cable have shown that there is a tremendous light loss within the first two meters of the fiber optic cable exiting the light source followed by a rather gradual decrease in lumen output in each successive additional meter of cable as you measure further away from the light source. Typically, this tremendous light energy loss within the first two meters is wasted because the illuminator for most signage and architectural lighting applications is located behind a sign face or hidden on top of a building or above ceiling panels and usually is hidden from view. In order to redistribute this "lost" light further down the cable, applicant discovered that placing a highly reflective tube or sleeve over the first two meters of the cable from the light source forward serves to reflect the light back into the cable so that the light is transmitted forward. Since the light does not exit the cable in the first two meters it has nowhere to go but down the cable where the added brightness appears in the display. A significant light output increase can be observed when using any type of reflector including silver electrical conduit, silver mylar tape wrapped around the cable, and 3M SOLF film that has many little lenticular lenses or prisms extruded onto the face of this film that can be later rolled into a tube to conduct light. Even a black cable or heat shrink tubing may serve to improve light transmission but to a lesser extent than the reflective white or silver surfaces.

Essentially the same process can be used to create a cable device in which the fiber optic cables are not constrained in bundles 225. Rather, individual optical fibers could be dispersed in place of bundles 225. Further, the rolls 225a could be mounted for rotation about member 222 in the same manner as roll 234 so that the optical fibers could be woven about member 222. This would form a cable having a center core with an outer layer of optical fibers or multiple overlapping optical fiber layers creating various optical designs. For manufacture of a 0.580 inch 98 element fiber optic cable, core member 222 can suitably be constituted by a 0.312 inch OD by 0.15 inch ID PVC tube; sheath 227 can be a 0.040 inch diameter transparent PVC jacket; and bundles 225 can comprise 14 evenly distributed bunches of 7×0.030 inch fiber optic elements. Utilizing a central core of reflective material, the fibers are efficiently placed, so that their contributions to the externally visible illumination are not wasted by being lost due to placement in the central core region.

The hollow 237 (See FIG. 14) of tube 222 is left devoid of fibers currently contributing to the visible lateral illumination. Hollow 237 may, however, be optionally utilized to extend electrical wiring to remote light sources, to extend fibers to carry light to serially mounted cables or signalling devices, or for other similar conduit purposes. Where light is to be communicated by longitudinal transmission through hollow 237, the inside surface 238 of tube 222 may also be made reflective. Such treatment will reflect lateral emissions back to the internally located fibers to enhance longitudinal transmission through the shielded center of the core region. The core can also be made of a solid material instead of a hollow tube.

Core member 222 may also be produced from a flexible, memory retentive material which can be bent or formed into different shapes and retains such shapes. For example, member 222 could be formed from a drawn, ferromagnetic material similar to coat hanger wire which can be bent into various shapes and retain such shape. Other flexible, shape retentive materials are known. The resulting product or cable can be used to create designs, letters, optical art work and sculptures. Alternately, a flexible, memory retentive wire or rod could be inserted through hollow 237 of tube 222 alone or along with other electrical conductors in order to impart the above bending characteristics to cable 220.

Figure 16:
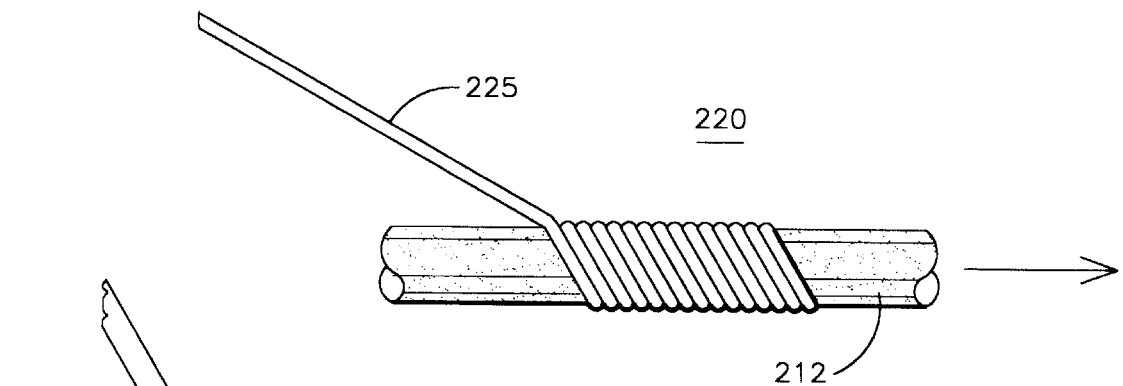

Turning now to FIG. 16, there is shown formation of a fiber optic cable 220 using a single optical fiber 225 which is spirally or helically wound about a core member 212. This form of optical fiber cable can be produced by using a single dispensing roll 225a (See FIG. 15) which is rotated about the longitudinally extending core member 222 as the core member is being advanced through the manufacturing process.

Figure 17:
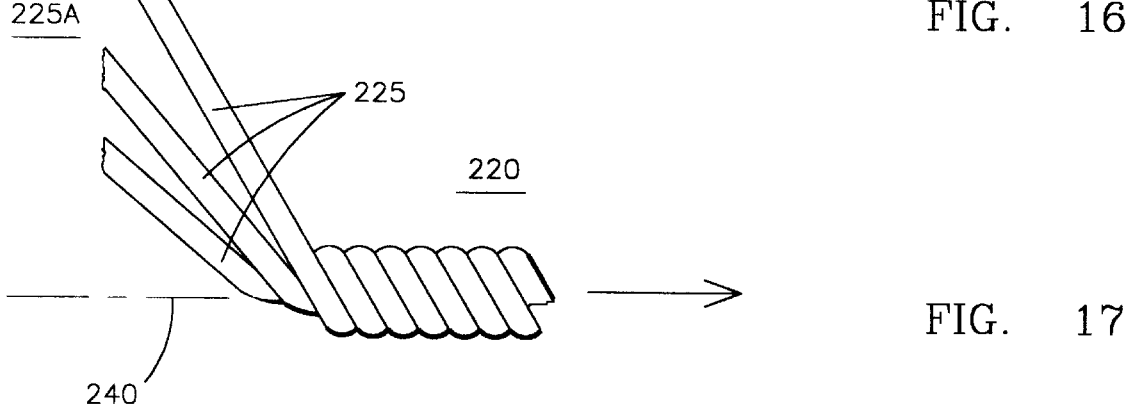

FIG. 17 illustrates a further modification of the manufacturing process in which a plurality of spools 225a containing single optical fibers are rotated about a common longitudinal axis 240 so as to cause the individual fibers to be interlaced as they are fed into a tape dispensing station such as the station at which the tape dispenser 235 is shown in FIG. 15. It will be noted that manufacture of a cable formed of twisted optical fibers in the manner shown in FIG. 17 does not require the central core member 222. Furthermore, the rolls of optical fibers could be maintained stationary and the fibers twisted in a manner described below to achieve essentially the same twisted cable.

Figure 18:
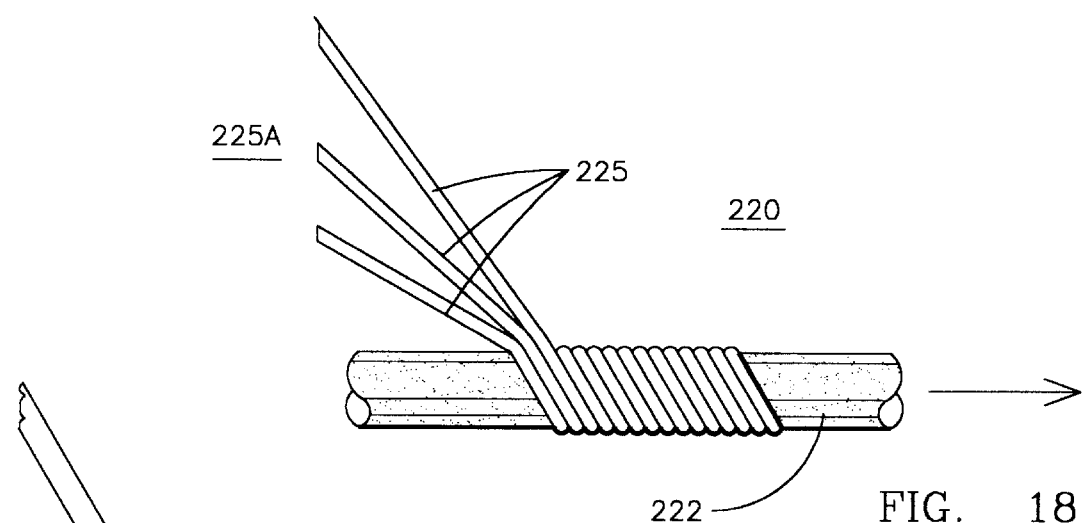

Referring to FIG. 18, there is shown the manufacturing process of FIG. 17 in combination with a central core member 222. In this instance, a plurality of single optical fibers 225 are wrapped in parallel helical form about the central core member 222. It will be apparent that the formation of the optical cable as shown in FIG. 18 can be achieved by using multiple rollers 225a rotated concurrently about the axially moving core member 222. Without the core member 222, the fibers will twist as shown in FIG. 17. It should also be noted that in the construction of the cable as shown in FIG. 17, the cable spools 225a could remain stationary and the cable twisted in a conventional manner as the fibers are pulled from the spools. Applicant has found that a conventional rope making machine can be adapted to produce a twisted cable of the type shown in FIG. 17 by substituting optical fibers for the yarn normally used in rope manufacture.

Figure 19:
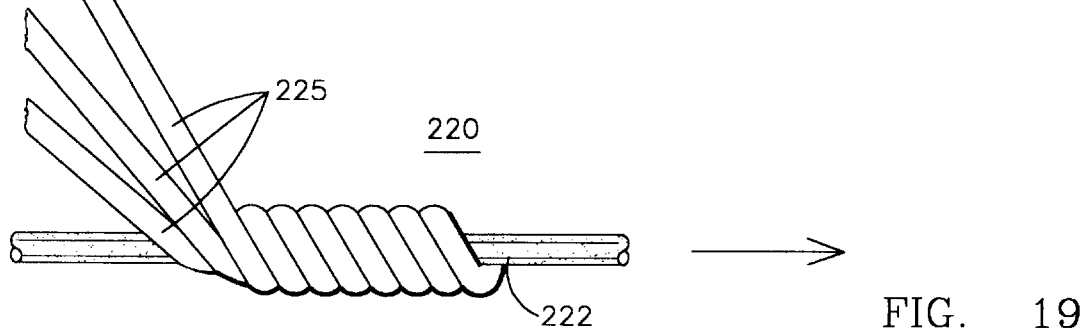

FIG. 19 shows an alternative method for producing a fiber optic cable from a plurality of single optical fibers. In the embodiment of FIG. 19, the optical fibers are first dispensed from their individual spools and rewound onto a separate single spool in a parallel arrangement. The multiple optical fibers are then dispensed from the single spool in the manner shown in FIG. 19 with the single spool being arranged on a plate so that it can be rotated about the center core 222. This arrangement produces a random pattern of the optical fibers as the fibers twist and are wrapped about the center core. The twisting puts additional bending into the fibers so that there may be an increase in the light output of the fibers although the random or haphazard pattern of the twisting about the center core 222 does not produce a uniform pattern of arrangement of the optical fibers as would be accomplished with the arrangement of FIG. 18. Although the spooling of the optical fibers from multiple spools onto a single spool is not specifically shown in FIG. 19, it will be apparent that this is a separate operation which simply requires unrolling of the fibers from one group of spools and re-rolling the fibers onto a single spool in parallel.

FIG. 20 is an arrangement which is a multi-fiber counterpart to the arrangement of FIG. 17. The only difference in FIG. 20 is that the elements 225 being twisted to form the cable are made up of multiple individual optical fibers which have previously been formed into groups of fibers as shown in FIG. 20A. The multiple optical fibers may be wound in any of the methods described above including simply feeding the fibers into a sheath or other retainer in a parallel arrangement without twisting.

FIG. 21 also uses individual elements which are comprised of multiple optical fibers from multiple spools. In the embodiment of FIG. 21, it is desirable to rotate the spools about the central axis 240 to effect the braiding of the groups of multiple fibers into the final cable as shown. The primary difference between the embodiment illustrated in FIG. 20 and that illustrated in FIG. 21 is that FIG. 21 utilizes rotating spools dispensing the pre-bundled multiple fibers as individual elements into the braiding process. In FIG. 21, the spools are maintained stationary and the braiding process is obtained by twisting the cable at 242. The aforementioned rope making machine is adaptable to produce the cable as shown in FIG. 20 by feeding the groups of multiple fibers into the rotating cable pulling mechanism.

FIG. 22 is a counterpart to the cabling method illustrated in FIG. 19 in which the individual fibers are now replaced by multiple fibers. Each of the groups of multiple fibers (FIG. 22A) are wound on individual spools and then dispensed from those spools as the spools are rotated about the center core 222. The result is twisting of the multi-fiber cabling sets as the sets are wound about the center core as shown in FIG. 22B.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A lateral illumination fiber optic cable comprising:
   a central core extending longitudinally of the cable;
   at least one optical fiber helically wound about said central core over a selected length thereof; and
   a transparent tubular sheath encompassing the core and the optical fiber.

2. The lateral illumination fiber optic cable of claim 1 and including a plurality of parallel arranged optical fibers wound as a set about said central core in a non-overlapping pattern.

3. The lateral illumination fiber optic cable of claim 2 and including a plurality of sets of said parallel arranged optical fibers wound about said central core in a non-overlapping pattern.

4. A lateral illumination optical fiber cable comprising:
   a plurality of optical fibers having ends and being arranged in a set of non-intertwined parallel fibers; and
   a plurality of sets of said fibers intertwined to form the cable.

5. The lateral illumination optical fiber cable of claim 4 and including a central core about which said sets of non-intertwined parallel fibers are interlaced.

6. The lateral illumination optical fiber cable of claim 4 wherein said core comprises a tubular member having an outer reflective surface.

7. The lateral illumination optical fiber cable of claim 6 wherein said core is hollow.

8. The lateral illumination optical fiber cable of claim 6 wherein said core comprises a bendable, metallic material.

9. A lateral illumination fiber optic cable comprising a plurality of sets of optical fibers, said sets being interwoven to form a plurality of bends in the optical fibers of each set, and each set being formed of a plurality of generally parallel aligned, non-interwoven optical fibers.

10. A lateral illumination fiber optic lighting system comprising a fiber optic cable having a plurality of sets of optical fibers, said sets being interwoven to form a plurality of bends in the optical fibers of each set, and each set being formed of a plurality of generally parallel aligned, non-interwoven optical fibers and a light source for directing light into an end of said cable, said light source comprising an optical system having a reflector and a high intensity lamp positioned to direct light into the end of said cable, said reflector having an ellipsoid shape with proximal and distal foci, said lamp having an effective light origin at said proximal focus and said end of said cable being located at a position slightly displaced from said distal focus whereby said high intensity light is not focused on said cable end.

11. The lateral illumination fiber optic lighting system of claim 10 wherein said reflector has an ellipse center and said end of said cable is positioned between said ellipse center and said distal focus point of said reflector and lamp assembly whereby a spot size of a beam of light produced by said light source at said end of said cable will have a diameter between about 1 and 1.25 times a diameter of said end of said cable.

12. A lateral illumination fiber optic cable comprising:
    a central core;
    a plurality of optical fibers distributed perimetrically about the core and extending axially along the core; and
    an outer sheath enclosing the optical fibers and the core, the outer sheath being light transmissive and having a tint whereby the lateral illumination appears substantially tinted the color of the outer sheath.

13. A lateral illumination fiber optic cable for connection to a light source for injecting light into the cable comprising:
    a central core;
    a plurality of optical fibers distributed perimetrically about the core and extending axially along the core; and
    an outer sheath enclosing the optical fibers and the core; and
    a non-light transmissive cladding overlaying at least a first extent of the cable for increasing light transmission into another extent of the cable.

14. A lateral illumination fiber optic cable for connection to a light source for injecting light into the cable comprising:
    a plurality of juxtaposed optical fibers enclosed within an outer sheath to form a cable; and
    a non-light transmissive cladding overlaying at least a first extent of the cable for increasing light transmission into another extent of the cable.

15. A lateral illumination fiber optic cable comprising:
    a plurality of optical fibers; and
    an outer sheath enclosing the optical fibers, the outer sheath being light transmissive and having a tint whereby the lateral illumination appears substantially tinted the color of the outer sheath.

16. A fiber optic cable assembly comprising a plurality of optical fibers and a ferrule assembly having a generally central passageway therethrough for passing and supporting at least one end of the cable, the ferrule assembly comprising a first externally threaded ferrule section, a second internally threaded ferrule section and a compressible sleeve inserted in said second ferrule section, said sleeve being compressed about said cable when said first ferrule section is threaded into said second ferrule section.

17. The fiber optic cable assembly of claim 16 wherein said sleeve is formed with at least one outer tapered portion transitioning from a larger to a smaller diameter wherein said sleeve is driven at least partially into the passageway in said second ferrule section for compressible engaging the cable.

18. The fiber optic cables assembly of claim 17 wherein the second ferrule section is formed with an internal taper from a larger to a smaller diameter in an area wherein said sleeve is positioned whereby said sleeve is guided by said internal taper into compression about said cable.

* * * * *